(12) United States Patent
Norimatsu et al.

(10) Patent No.: US 8,803,486 B2
(45) Date of Patent: Aug. 12, 2014

(54) POWER SUPPLY DEVICE

(75) Inventors: Yasuaki Norimatsu, Hitachinaka (JP); Shinji Imai, Hitachi (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 348 days.

(21) Appl. No.: 13/145,432

(22) PCT Filed: Feb. 17, 2010

(86) PCT No.: PCT/JP2010/052338
§ 371 (c)(1),
(2), (4) Date: Sep. 13, 2011

(87) PCT Pub. No.: WO2010/095641
PCT Pub. Date: Aug. 26, 2010

(65) Prior Publication Data
US 2011/0316489 A1    Dec. 29, 2011

(30) Foreign Application Priority Data
Feb. 17, 2009    (JP) .................................. 2009-034019

(51) Int. Cl.
*H02J 7/00*    (2006.01)
*B60L 1/00*    (2006.01)
*H02P 1/00*    (2006.01)

(52) U.S. Cl.
USPC .......................... 320/166; 307/10.1; 318/139

(58) Field of Classification Search
USPC .......................... 320/166; 307/10.1; 318/139
See application file for complete search history.

(56) References Cited

U.S. PATENT DOCUMENTS

| | | | | |
|---|---|---|---|---|
| 5,483,433 A | * | 1/1996 | Yang ................................. | 363/43 |
| 6,002,221 A | * | 12/1999 | Ochiai et al. .................. | 318/139 |
| 6,798,175 B2 | * | 9/2004 | Hanada et al. ................ | 320/166 |
| 7,304,402 B2 | * | 12/2007 | Osawa et al. ................. | 307/10.1 |
| 7,573,238 B2 | * | 8/2009 | Kawai .............................. | 320/132 |
| 7,705,562 B2 | * | 4/2010 | Takahashi et al. ............ | 320/128 |
| 7,777,433 B2 | * | 8/2010 | Yamaguchi et al. .......... | 318/139 |
| 2005/0253563 A1 | * | 11/2005 | Logsdon ....................... | 320/166 |
| 2007/0108959 A1 | | 5/2007 | Amano | |
| 2008/0106234 A1 | | 5/2008 | Yun | |
| 2009/0108681 A1 | * | 4/2009 | Litovsky ...................... | 307/110 |

FOREIGN PATENT DOCUMENTS

| | | |
|---|---|---|
| CN | 101179201 A | 5/2008 |
| CN | 101340147 A | 1/2009 |
| EP | 1 930 919 A1 | 6/2008 |

(Continued)

OTHER PUBLICATIONS

Korean Office Action with English Translation dated Oct. 8, 2012 (seven (7) pages).

(Continued)

*Primary Examiner* — M'Baye Diao
(74) *Attorney, Agent, or Firm* — Crowell & Moring LLP (57) ABSTRACT

A power supply device according to the present invention includes: a capacitor 10 connected in parallel with a battery; two switching circuits 31,32 connected in series with the capacitor 10; a pre-charge switching circuit 33 connected in parallel with one of the two switching circuits 31,32; and a control unit 14 that, when a voltage of the capacitor 10 is lower than a voltage of the battery 1, controls the pre-charge switching circuit 33 and the switching circuit 32 and performs pre-charging current limitation for the capacitor 10.

1 Claim, 6 Drawing Sheets

(56) References Cited

FOREIGN PATENT DOCUMENTS

| JP | 2001-128468 | A |   | 5/2001 |          |
|----|-------------|---|---|--------|----------|
| JP | 2001128468  | A | * | 5/2001 | H02M 7/48 |
| JP | 2005-269873 | A |   | 9/2005 |          |
| JP | 2005-312156 | A |   | 11/2005|          |
| JP | 2007-143221 | A |   | 6/2007 |          |
| JP | 2007-191088 | A |   | 8/2007 |          |
| JP | 2007-244124 | A |   | 9/2007 |          |
| JP | 2008-151745 | A |   | 7/2008 |          |

| KR | 10 2008-0066172 | A  | 7/2008 |
|----|-----------------|----|--------|
| WO | WO 2007/026492  | A1 | 3/2007 |

OTHER PUBLICATIONS

Japanese Office Action with English Translation dated Oct. 16, 2012 (six (6) pages).

Chinese-language Office Action dated Jun. 28, 2013 with English translation (Twelve (12) pages).

International Search Report dated May 11, 2010 (two(2) pages).

\* cited by examiner

POWER SUPPLY DEVICE

TECHNICAL FIELD

The present invention relates to a power supply device having a hybrid structure that includes a capacitor and a battery.

BACKGROUND ART

In recent years, due to the progression of battery technology, the wide use of hybrid automobiles has advanced rapidly. This type of hybrid automobile employs a power supply system in which a motor or the like is driven by a battery, and during deceleration energy is regenerated into the battery. In this type of power supply system, due to the emergence of batteries of new types, reductions in their size and weight, and increase of their specific power, development has proceeded from sealed lead acid batteries to Ni H batteries and then to Li ion batteries. With batteries of all these types, development of the active material of the battery and development of the battery construction for high capacity and high output have been performed in order to enhance the specific energy density, and efforts are being exerted in order to implement increase of the specific power and supply of usable power over a longer time period.

However although efforts are being made in the automobile field to improve fuel efficiency by yet a further level, the tendency is also predicted that, from the present, new fuel efficiency improvement functions will also be added to automobiles that already exist, in order to reduce emissions of carbon dioxide and so on. Due to this, technology is moving in the direction in which it will be considered to be necessary to provide power supplies having lower losses, in other words having lower internal resistance.

If such a low resistance power supply is implemented as a secondary battery, then the problem arises that its maximum output current is low. Due to this, the requirement for a high capacity electro chemical capacitor with which there is no need to limit the output current is increasing, and, as one example thereof, an electric double layer capacitor (EDLC) is generally known. Such an electric double layer capacitor exhibits a characteristic intermediate between that of a capacitor used for smoothing or the like and that of a battery. Moreover, a hybrid capacitor (HC) doped with lithium ions may be suggested as a capacitor of higher specific energy density that exhibits a characteristic intermediate between that of an electric double layer capacitor and that of a battery.

In relation to these capacitors, since the output power density is higher than that of a battery although the energy density is small, accordingly examples are known that are applied to idling stop systems in which instantaneous output is demanded. However generally a hybrid structure with a battery such as a lead acid battery or the like is employed, since the self discharge of such a capacitor is large. A mechanical relay or a semiconductor switching element such as a MOS-FET (a metal oxide field effect transistor) or the like is used for the switch that connects the lead acid storage battery and the capacitor.

Now, since the self discharge of a capacitor is large, a large potential difference can easily build up between the lead acid storage battery and the capacitor when, for example, restarting is to be performed after a long term period of storage. When the switch between the lead acid storage battery and the capacitor is turned ON in this state in which a potential difference is present, an excessively great current is drawn from the lead acid storage battery since the internal resistance of the capacitor is small, and this can lead to deterioration of the life of the lead acid storage battery.

As a method for preventing this kind of flow of excessively great current flow, a pre-charging method is known of limiting the charging current by providing a switch with a limiting resistor and another switch in parallel with this switch, and flowing an initial pre-charging current to the capacitor via this limiting resistor (for example, refer to Patent Document #1).

Furthermore, a structure is known in which a pre-charging function is implemented by providing a semiconductor switching element in parallel with the switch instead of the limiting resistor, and by using this semiconductor switching element (for example, refer to Patent Document #2).

CITATION LIST

Patent Literature

Patent Document #1: Japanese Laid Open Patent Publication 2005-312156;
Patent Document #2: Japanese Laid Open Patent Publication 2007-143221.

SUMMARY OF THE INVENTION

Technical Problem

However, when a capacitor having a high capacitance of several hundreds to several thousands of farads is pre-charged via a limiting resistor, the problem arises that, due to the CR time constant, the charging period becomes too long. It should be understood that, while it is necessary for the resistance value of the limiting resistor to be made small in order to shorten this charging period, if the limiting resistance value is made small and a larger current flows, it is inevitable that the rated power value of the limiting resistor must be increased in order for it to be adequate for this high current value. Due to this, there is a tendency for the size and the cost of the limiting resistor to increase, and moreover it also becomes necessary to add a cooling construction for handling the heat generated by the limiting resistor.

On the other hand, if it is arranged to perform pre-charging using only a semiconductor switching element instead of a limiting resistor, then it is necessary to control the control voltage of the semiconductor switching element, so as not to exceed the rated capacity of the switching element. Due to this, it is difficult to flow a large current of from several tens to several hundreds of amperes, so that the pre-charge time period becomes undesirably long. Moreover, it also becomes necessary to consider the cooling related structure, such as monitoring the temperature of the semiconductor switching element or the like.

Solution to the Problem

According the 1st aspect of the present invention, a power supply device comprises: a capacitor connected in parallel with a battery; two switching circuits connected in series with the capacitor; a pre-charge switching circuit connected in parallel with one of the two switching circuits; and a control unit that, when a voltage of the capacitor is lower than a voltage of the battery, controls the pre-charge switching circuit and at least one of the two switching circuits and performs pre-charging current limitation for the capacitor.

It should be noted that each of the two switching circuits connected in series with the capacitor and the pre-charge switching circuit may comprise a single semiconductor switching element, or a plurality of semiconductor switching elements that are connected in parallel.

In addition, during the pre-charging current limitation, the control unit may control the semiconductor switching elements included in each switching circuit that is connected in series with the capacitor to OFF and controls a semiconductor switching element included in the pre-charge switching circuit to ON, and thereby puts into conducting state the pre-charge switching circuit and a internal diode of a switching element of a switching circuit to that the pre-charge switching circuit is not connected in parallel.

Further, during the pre-charging current limitation, the control unit, along with controlling a semiconductor switching element included in the pre-charge switching circuit to ON, also controls a semiconductor switching element of one of the two switching circuits that are connected in series with the capacitor, which one is connected in parallel with the pre-charge switching circuit by PWM (Pulse Width Modulation), while controlling a semiconductor switching element of other one of the two switching circuits to OFF.

Yet further, it should be accepted that a switching element included in the pre-charge switching circuit may be controlled by PWM (Pulse Width Modulation), or it should be also accepted that the control unit controls gate voltage of the semiconductor switching element included in the pre-charge switching circuit, so as to adjust ON resistance of this semiconductor switching element.

Additionally, the capacitor may be a hybrid capacitor doped with lithium ions. In this case, during pre-charging current limitation, the control unit may control the semiconductor switching element of the pre-charge switching circuit stepwise, so as to cause pseudo increase of internal resistance of the hybrid capacitor.

According to the 2nd aspect of the present invention, a power supply device comprises: a capacitor connected in parallel with a battery; two switching circuits connected in series with the capacitor, and each comprising a single semiconductor switching element or a plurality of semiconductor switching elements connected in parallel; and a control unit that, when a voltage of the capacitor is lower than a voltage of the battery, performs pre-charge current limitation for the capacitor by controlling a semiconductor switching element of each switching circuit so as to apportion a loss during current limitation between the two switching circuits.

It should be noted that, during the pre-charging current limitation, the control unit, along with controlling a semiconductor switching element of one of the two switching circuits to OFF, may control a semiconductor switching element of other one of the two switching circuits by PWM control, and thereby puts into conducting state a internal diode of the semiconductor switching element of the one of the two switching circuits, and the other one of the two switching circuits.

During the pre-charging current limitation, the control unit, along with controlling a semiconductor switching element of one of the two switching circuits to OFF, may control gate voltage of a semiconductor switching element of other one of the two switching circuits, and thereby puts into conducting state a internal diode of the semiconductor switching element of the one of the two switching circuits, and the other one of the two switching circuits.

Advantageous Effect of the Invention

According to the present invention, along with suppressing the battery deterioration and reducing the size of the power supply device, the capacitor can be charged up to be a usable state in a short time.

DESCRIPTION OF THE EMBODIMENTS

In the following, embodiments for implementation of the present invention will be explained with reference to the drawings.

Embodiment 1

Figure 1:
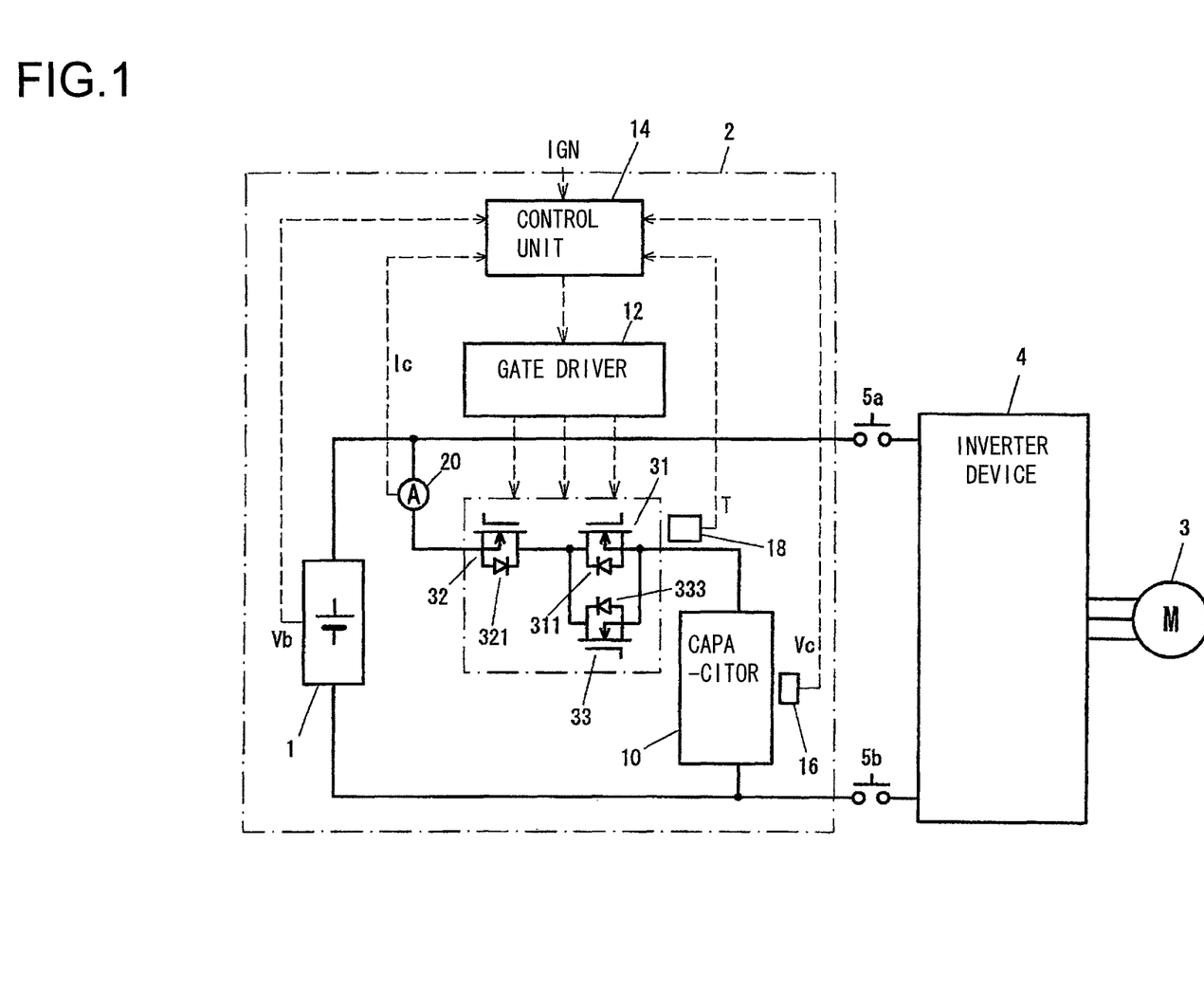
FIG. 1 is a schematic block diagram showing a power supply device according to a first embodiment of the present invention when it is being used for driving a rotating electrical machine.

FIG. 1 is a schematic block diagram showing a power supply device according to the first preferred embodiment of the present invention when it is being used for driving a rotating electrical machine. In FIG. 1, a power supply device 2 is connected to an inverter device 4 via relays 5a and 5b. And a rotating electrical machine 3 is driven by the inverter device 4 so that it rotates. The rotating electrical machine 3 may be a starter motor of an engine idling stop system for starting an engine, or may be a motor generator.

The power supply device 2 includes a secondary battery 1 such as a lead acid storage battery or the like and a capacitor 10 connected in parallel therewith, a MOSFET for charging cutoff 31, a MOSFET for discharging cutoff 32, a MOSFET for pre-charging 33, a gate driver 12, a control unit 14, a voltage detection unit 16, a temperature detection unit 18, and a current detection unit 20.

While, in this embodiment, an electric double layer capacitor is used as the capacitor 10, it would also be possible to apply the present invention with some other high capacity capacitor for which similar protection control is required to that for an electric double layer capacitor. The capacitor 10 includes a plurality of cells. While, in this embodiment, a low resistance structure is provided by using an N channel MOSFET for each of the MOSFETs 31 through 33, of course it would be possible to use P channel MOSFETs for any one of the MOSFETs or for all of them; any element that can implement a similar function may be applied.

Furthermore, if N channel MOSFETs are used for the MOSFET for discharging cutoff 32, the MOSFET for charging cutoff 31, and the MOSFET for pre-charging 33, then a voltage boost type gate driver is used for the gate driver 12 that drives the gates of these MOSFETs. Any type of voltage boost type gate driver will serve, such as a charge pump type or the like, provided that it is capable of driving the gates of N channel MOSFETs.

The control unit 14 is a unit that performs overall control of the power supply device as a whole, and, while a dedicated IC or a general purpose microcomputer may be used, these are not limitative; any device that implements similar functions will be acceptable. Apart from its control function for controlling the gate driver 12, the control unit 14 is also endowed with a function of monitoring voltages in various sections, a balance switch function of adjusting the voltage of each cell of the capacitor 10, a function of communicating with a higher level device, and so on.

The various voltages monitored by the control unit 14 are the total voltage of the secondary battery 1, the voltage of each cell of the capacitor 10 as detected by the voltage detection unit 16 and its total voltage, the output of the current detection unit 20, the output of the temperature detection unit 18, and so on. The outputs from each of these sections are inputted and are A/D converted by an A/D converter provided to the control unit 14. Moreover, any required system may be provided for implementing the function of communication with a higher level, such as a CAN (Controller Area Network), an I2C (Inter Integrated Circuit), an SPI (System Packet Interface), or the like. In this embodiment, a start signal when the rotating electrical machine 3 is to be started (an IGN signal) is inputted from a higher level via this communication function.

While, in this embodiment, the device that is used for performing detection of the current is a Hall element, it would also be acceptable to detect the current by detecting the voltage between both ends across the MOSFET for discharging cutoff 32 and the MOSFET for charging cutoff 31 with a differential amplifier, by measuring the voltage across a shunt resistor, or by measuring the voltage of a current transformer or the like. Furthermore, while here it is supposed that the detected current value is acquired by an A/D converter that is housed within the control unit 14, any arrangement would be acceptable, provided that it can implement a similar function.

While, for the temperature detection unit 18, detection by dividing a voltage by an NTC thermistor or a PTC thermistor and a resistor in series therewith, or detection by a temperature IC or the like, may be considered, any device would be acceptable, provided that it can implement similar functionality. While, as the subjects for temperature detection, the cells of the capacitor, the board upon which the MOSFETs are mounted, or the chassis may be considered, other elements may be added according to requirements. It should be understood that the temperature detection unit 18 of FIG. 1 is one that detects the temperature of the board upon which the MOSFETs are mounted. While it is supposed that the detected value of temperature is acquired by an A/D converter that is housed within the control unit 14, any device would be acceptable, provided that it can implement similar functionality.

In the path for supply of electrical power, the MOSFET for discharging cutoff 32 and the MOSFET for charging cutoff 31 are provided in series with the capacitor 10 on a positive side supply path from the capacitor 10 to the secondary battery 1. And the MOSFET for pre-charging 33 is connected in parallel with the MOSFET for charging cutoff 31. It should be understood that, according to requirements, it would be acceptable to shift the MOSFET for discharging cutoff 32, or the MOSFET for charging cutoff 31 with the MOSFET for pre-charging 33 to the ground side, and it would also be acceptable further to add one or more MOSFETs to the positive side or to the ground side.

The MOSFET for discharging cutoff 32 is set up so that the forward direction of its body diode 321 is oriented oppositely to the discharge current direction of the capacitor 10. And the MOSFET for charging cutoff 31 and the MOSFET for pre-charging 33 are set up so that the forward directions of their body diodes 311 and 333 are oriented oppositely to the charging current direction of the capacitor 10.

Since the MOSFET for charging cutoff 31 has the body diode 311 that is connected in the opposite direction thereto, accordingly, even if the MOSFET for charging cutoff 31 is turned OFF, still the discharge current from the capacitor 10 is able to flow through the body diode 311 in the forward direction, so that the discharge current is not intercepted. The MOSFET for discharging cutoff 32 is provided in series as a switch for interception of the discharge current. When this MOSFET for discharging cutoff 32 is turned OFF, the discharge current is intercepted. However, since the forward direction of the body diode 321 is the same as the direction of the charging current, accordingly, even if the MOSFET for discharging cutoff 32 is turned OFF, charging current is still able to flow through this body diode 321. Thus, by connecting the two MOSFETs 31 and 32 in series in opposite orientations in this manner, it is possible to perform both interception and non interception operation for both the charging current and the discharge current.

It should be understood that while, in the example shown in FIG. 1, the MOSFET for charging cutoff 31 is disposed in the power supply line side (i.e. in the positive side), while the MOSFET for discharging cutoff 32 is disposed on the side of the capacitor 1, an opposite arrangement would be equally acceptable.

In the normal usage state, in other words in the state in which there is no potential difference between the secondary battery 1 and the capacitor 10 and pre-charge is not being performed, the MOSFET for charging cutoff 31, the MOSFET for discharging cutoff 32, and the MOSFET for pre-charging 33 are all put into their ON states. Since a large current flows in the rotating electrical machine 3 at the time of IGN start, accordingly MOSFETs that can handle high current are used for the MOSFET for charging cutoff 31 and for the MOSFET for discharging cutoff 32.

Figure 2:
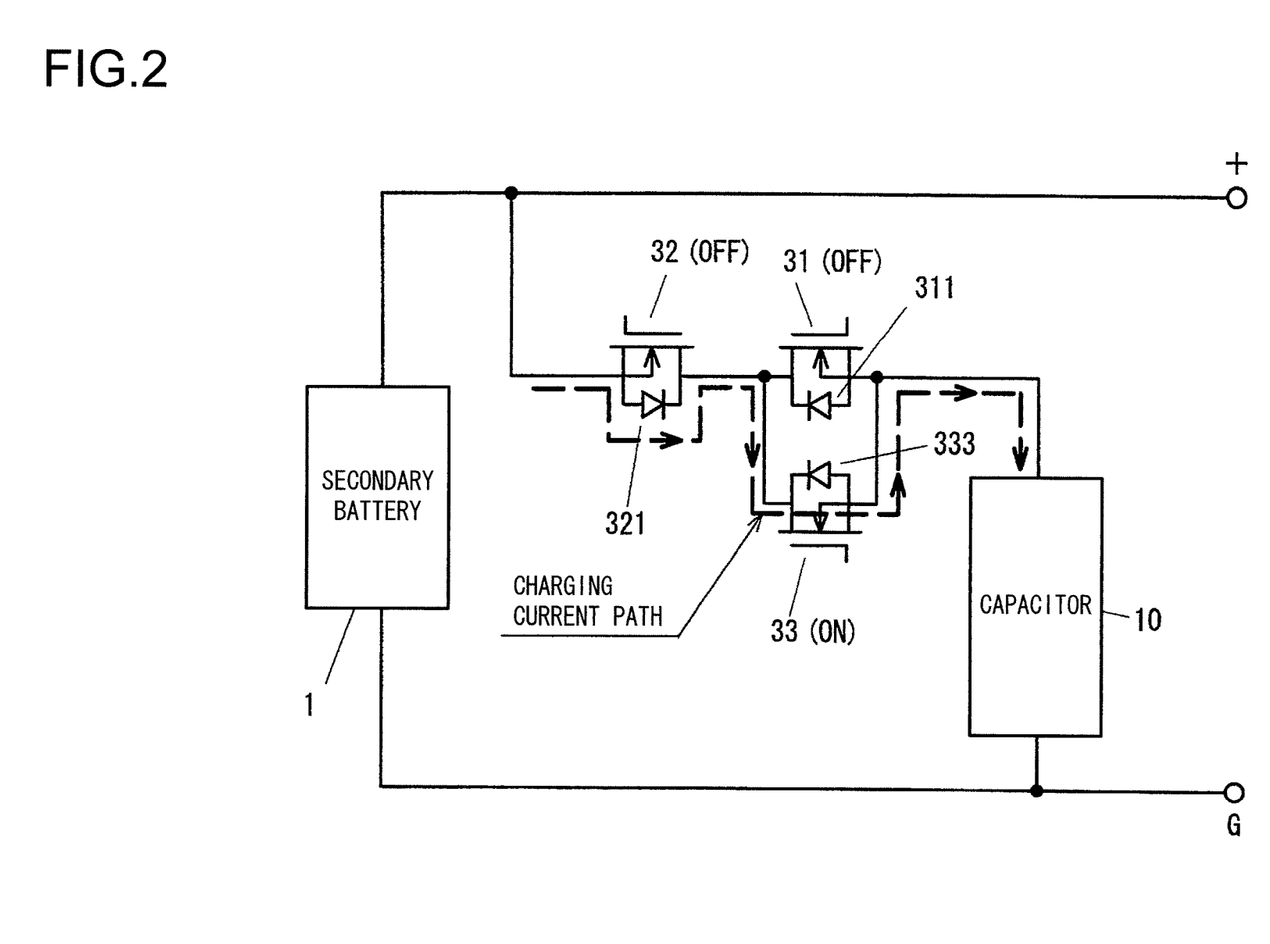
FIG. 2 is a figure showing the charging current path during pre-charging.
Figure 3:
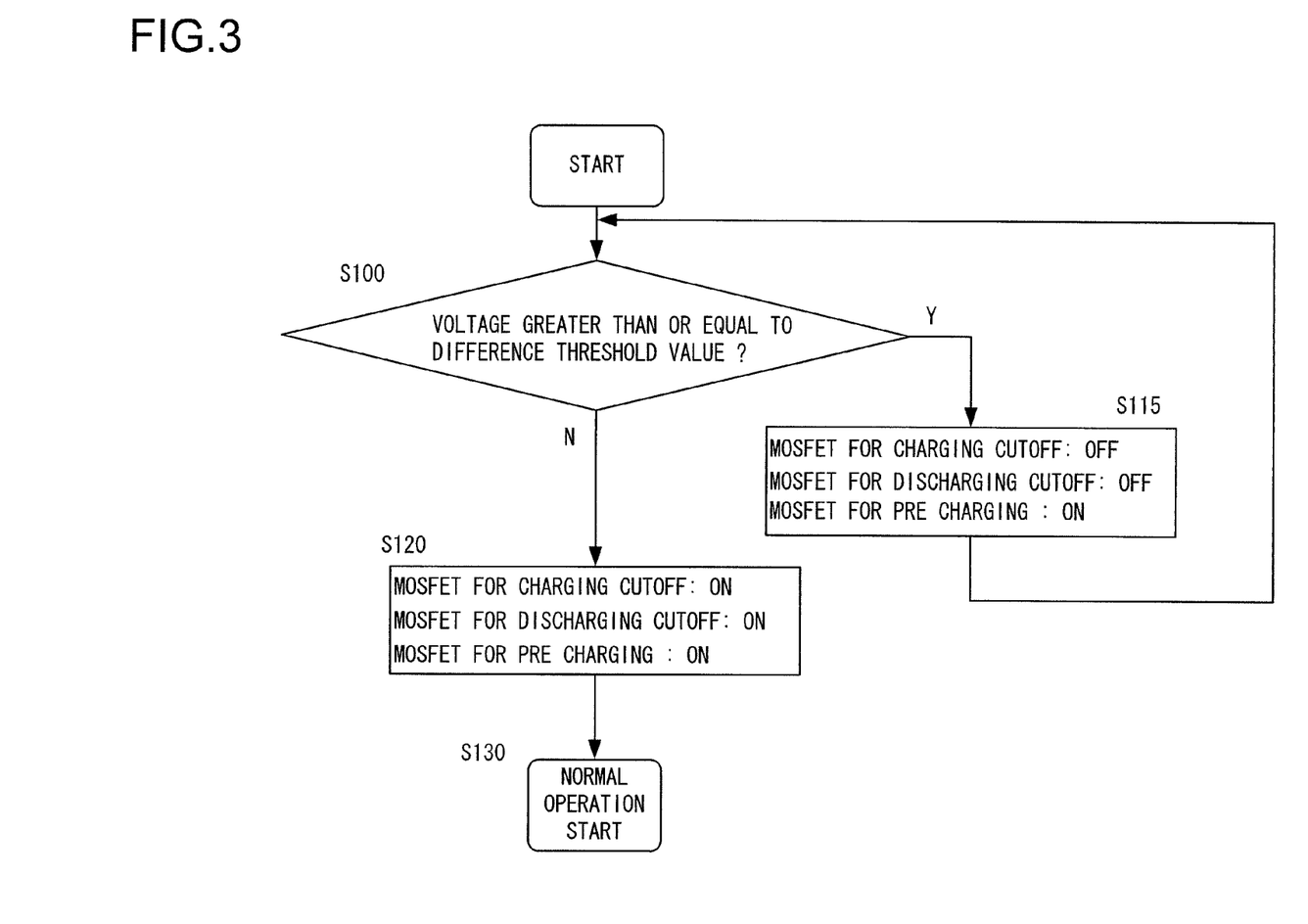
FIG. 3 is a flow chart showing a control procedure.

Next, the control method in this embodiment will be described. FIG. 2 is a figure showing the charging current path during pre-charging. In FIG. 2, the capacitor 10, the secondary battery 1, and the MOSFETs 31 through 33 that are required for explanation of this control method are shown. And FIG. 3 is a flow chart showing a control procedure for a control program that is executed by the control unit 14.

When a start signal IGN is inputted to the control unit 14 from a higher level, the flow of control is transferred to a step S100. In this step S100, the control unit 14 compares together the total voltage of the secondary battery 1 and the total voltage of the capacitor 10, and makes a decision as to whether or not the potential difference between them is greater than or equal to a threshold potential difference value that has been set in advance. In other words, it makes a decision as to whether or not the voltage of the capacitor 10 is lower than the voltage of the secondary battery 1, and accordingly pre-charging is necessary. While the forward voltage (for example 0.5 V) of the body diode 321 of the MOSFET for discharging cutoff 32 may be considered for this threshold potential difference value, this is not necessarily limitative.

If in the step S100 it is determined that the potential difference between the secondary battery 1 and the capacitor 10 is smaller than the threshold potential difference value, then the flow of control proceeds to a step S120, in which each of the MOSFETs 31 through 33 is set to the ON state, in other words the system is put into its normal usage state in which charging and discharging of the capacitor 1 can be performed freely. Thereafter the flow of control proceeds to a step S130, in which normal operation as a power supply device is started.

On the other hand, if in the step S100 a decision of greater than or equal to the threshold potential difference value is reached, then the flow of control proceeds to a step S115, in which processing is executed for the pre-charge operation. In this step S115, in order to perform the pre-charge operation, the control unit 14 commands the gate driver 12 to put the MOSFET for charging cutoff 31 and the MOSFET for discharging cutoff 32 into their OFF states, while putting the MOSFET for pre-charging 33 into the ON state. At this time, charging current flows to the capacitor 10 by the path shown by the broken line.

In the MOSFET for discharging cutoff 32 that is in the OFF state, the charging current only passes through its body diode 321. On the other hand, the charging current is not able to pass through the MOSFET for charging cutoff 31 that is in the OFF state, so that it flows into the capacitor 10 via the MOSFET for pre-charging 33 that is in the ON state. Charging of the capacitor 10 is performed in this manner. It should be understood that, while the MOSFET for pre-charging 33 is controlled with the normally required gate voltage so as to be kept in the ON state, it would also be acceptable to arrange to adjust the charging current to a more optimum value by adjusting the gate voltage and thereby adjusting the ON resistance of the MOSFET for pre-charging 33.

For example, if the temperature of some element rises during pre-charging and becomes too great, then the gate voltage may be lowered so as to reduce the value of the charging current. Moreover, it would also be acceptable to adjust the charging current flow rate according to PWM (Pulse Width Modulation) control by supplying a PWM pulse to the gate of the MOSFET for pre-charging 33.

In the prior art, in order to perform current limitation during pre-charging, it was necessary for the burden of handling the loss to be handled only by a limiting resistor or by a semiconductor switching element for pre-charging (corresponding to the MOSFET for pre-charging 33). Moreover, since the permitted loss in a limiting resistor or a semiconductor switching element for pre-charging is small, it was difficult to flow a large current from several tens of amperes to several hundreds of amperes.

However, in this embodiment, by apportioning the loss in current limitation during pre-charging between a loss in the body diode 321 of the MOSFET for discharging cutoff 32 and a loss due to the ON resistance of the MOSFET for pre-charging 33, it is possible to anticipate enhancement of the performance for heat dissipation due to this sharing of the heat dissipation between the two MOSFETs 31 and 32. Furthermore, since the capacitor 10 has a certain internal resistance, accordingly some of the loss is apportioned to loss due to this internal resistance as well.

With the structure shown in FIG. 2, the magnitudes of the losses W(32), W(33), and W(10) in the MOSFETs 32 and 33 and the capacitor 10 when a large current flows during pre-charging are related to one another by W(32)>W(33)≥W(10), and it is a merit of this structure that the loss is shared with the MOSFET for discharging cutoff 32 that is fundamentally designed for high current and that thus has excellent heat dissipation performance.

It should be understood that while, in the embodiment described above, as an example, a case was explained in which the capacitor 10 was an electric double layer capacitor, if a hybrid capacitor in which the negative electrode is doped with lithium ions is employed for the capacitor 10, then the application of voltage to the gate of the MOSFET for pre-charging 33 during pre-charging should be performed abruptly in steps. In the case of a hybrid capacitor, when the current during the start of charging rises abruptly stepwise, the phenomenon appears of the terminal voltage decreasing greatly with respect to the off load voltage. In other words, it is possible to bring about pseudo increase of the internal resistance by increasing the current stepwise.

It will be understood that this pseudo increase of the internal resistance continues for the duration of the period of the pre-charge operation. Thus, if a hybrid capacitor is used for the capacitor 10, the internal resistance undergoes pseudo increase when voltage application to the gate of the MOSFET for pre-charging 33 is performed abruptly in steps, so that it is possible to increase the proportion of the loss that is borne by the capacitor 10. As a result, the proportion of the loss borne by the MOSFET for discharging cutoff 32 and the MOSFET for pre-charging 33 becomes smaller, so that, even if the potential difference between the secondary battery 1 and the capacitor 10 becomes larger and the pre-charge current becomes larger, it is still possible to handle this in a simple and easy manner.

Figure 4:
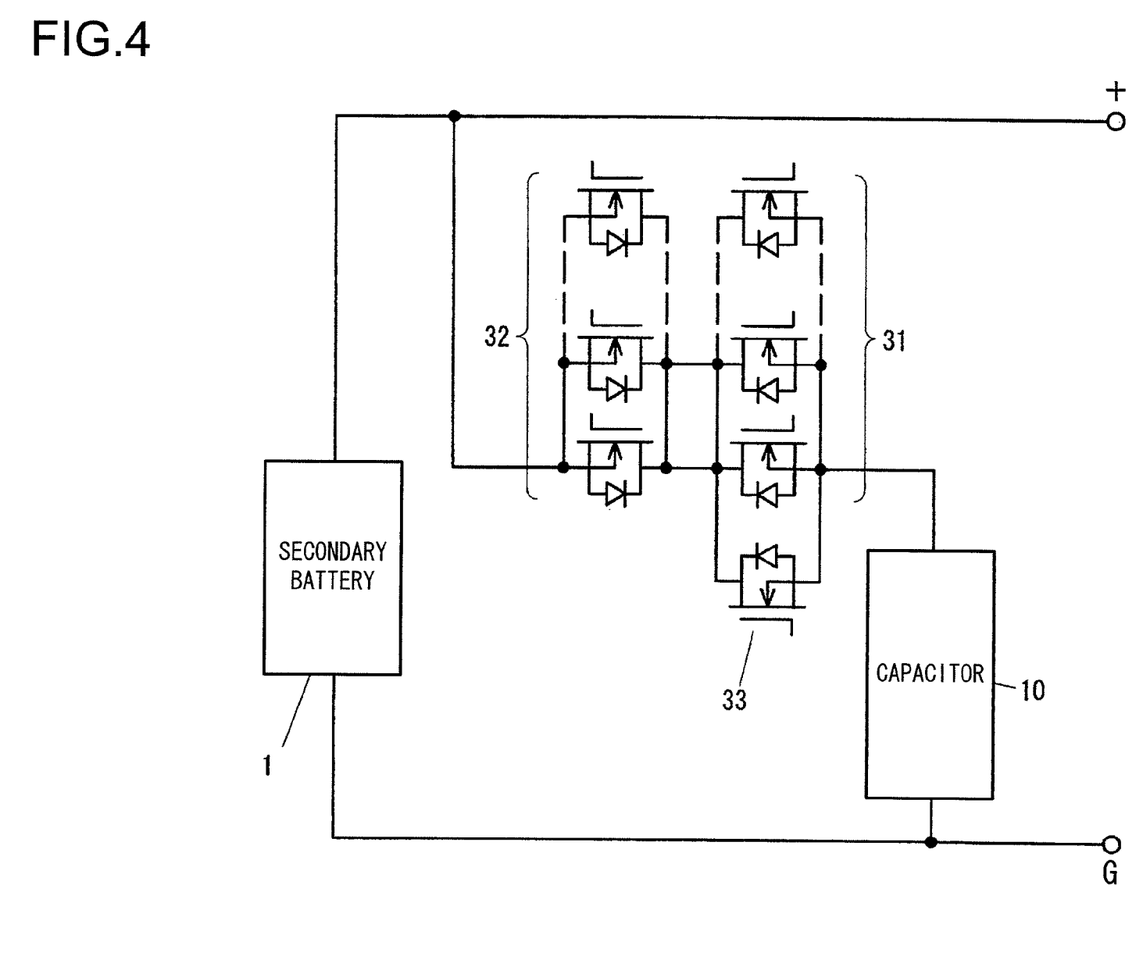
FIG. 4 is a figure showing a case in which each of a MOSFET for charging cutoff 31 and a MOSFET for discharging cutoff 32 is implemented as a plurality of MOSFETs connected in parallel.

In the example shown in FIGS. 1 and 2, one MOSFET was used for each of the MOSFET for charging cutoff 31, the MOSFET for discharging cutoff 32, and the MOSFET for pre-charging 33. However, as shown in FIG. 4, if it is supposed that during normal usage a large current will flow, it would also be acceptable to build each of the MOSFET for charging cutoff 31 and the MOSFET for discharging cutoff 32 as a plurality of MOSFETs connected in parallel. Of course, it would also be acceptable to build the MOSFET for pre-charging 33 as a plurality of MOSFETs connected in parallel. Moreover, it would also be acceptable to combine together the MOSFET for charging cutoff 31 and the MOSFET for pre-charging 33 that are connected in parallel, and in this case a single chip circuit that can drive their gates separately should be used.

As described above, in this embodiment, with this power supply device that includes the secondary battery 1 and the capacitor 10 that is connected in parallel therewith, the MOSFET for charging cutoff 31 and the MOSFET for discharging cutoff 32 are provided so as to be connected in series with the capacitor 10, and the MOSFET for pre-charging 33 is provided so as to be connected in parallel with the MOSFET for charging cutoff 31, so that it is arranged, when the voltage of the capacitor 10 is lower than the voltage of the secondary battery 1, to apportion the loss during current limitation between the MOSFET for pre-charging 33 and the MOSFET for discharging cutoff 32.

Since it is possible to reduce the burden upon each of the MOSFETs in this manner, accordingly, along with enhancing the performance for heat dissipation, it also becomes possible to flow a high current continuously during pre-charging. As a result, it becomes possible to charge up the capacitor 10 to a state in which it can be used over a short time period, while maintaining suppression of temperature elevation of the secondary battery 1 and prevention of any deterioration thereof, due to the fact that the value of the pre-charge current is limited to a value that does not impose any serious burden upon the secondary battery 1.

It should be understood that the MOSFETs 31 and 32 are elements that serve the function of switching circuits that perform opening and closing of the electrical power path for the capacitor 10, and this MOSFET 32 also functions as an element that shares the loss, due to current during pre-charge flowing only to the body diode 321 of this MOSFET 32.

Furthermore, it is possible to handle high currents in a simple and easy manner by building each of these MOSFETs 31 and 32 that serves as a switching circuit from a plurality of MOSFETs that are connected in parallel, and in this case it is also possible to disperse the losses in the MOSFET 32 over a larger number of elements. It should be understood that it is also possible to disperse the losses better by building the MOSFET for pre-charging 33 from a plurality of MOSFETs that are connected in parallel as well, and moreover doing so also makes it possible to employ MOSFETs of lower rated capacity. Furthermore, instead of simply performing ON control of the MOSFET for pre-charging 33 by performing adjustment of its gate voltage, it also becomes possible to adjust the pre-charge current value to any desired value by performing PWM control.

Embodiment 2

Figure 5:
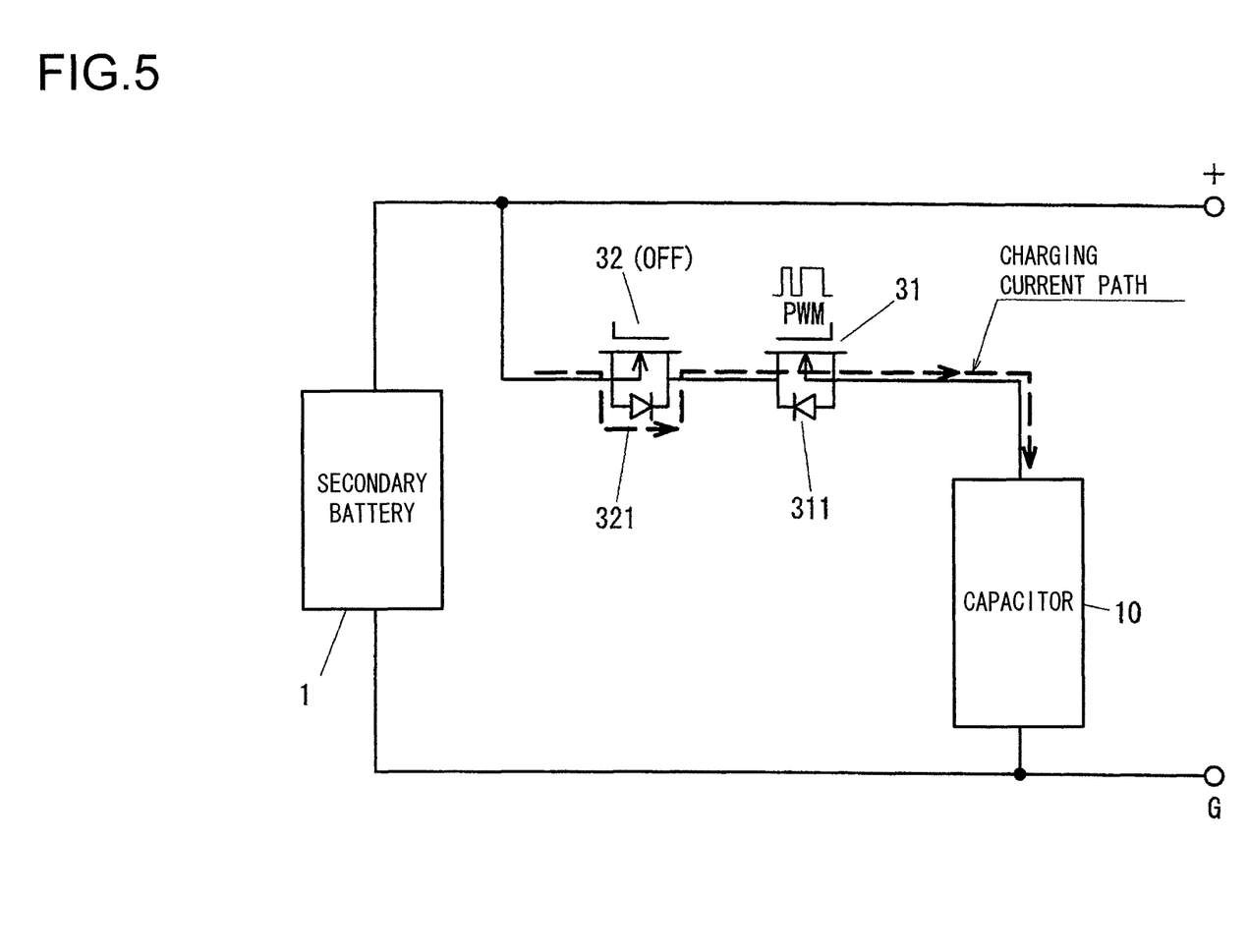
FIG. 5 is a figure for explanation of a power supply device according to a second embodiment of the present invention.

FIG. 5 is a figure for explanation of a power supply device according to a second embodiment of the present invention, and corresponds to FIG. 2 for the first embodiment. It should be understood that the other structures are the same as in the case of the first embodiment, and accordingly explanation thereof is omitted. In this second embodiment, the MOSFET for discharging cutoff 32 and the MOSFET for charging cutoff 31 are provided in series with the capacitor 10 in the positive side supply path from the capacitor 10 to the secondary battery 1, as shown in FIG. 5. Moreover, it should be understood that, in a similar manner to the case with the first embodiment, according to requirements, it would also be acceptable to shift either of these MOSFETs 31 and 32 to the ground side, or to add one or more further MOSFETs to the positive side or to the ground side.

During normal usage, both of the MOSFETS 31 and 32 are in the ON state. However during pre-charging, as shown in FIG. 5, along with the MOSFET for discharging cutoff 32 being turned OFF, the gate of the MOSFET for charging cutoff 31 is controlled by PWM control. As a result, as shown by the broken line, the charging current flows to the capacitor 10 via the body diode 321 of the MOSFET for discharging cutoff 32 and the MOSFET for charging cutoff 31. The PWM control for the MOSFET for charging cutoff 31 is adjusted according to the potential difference between the secondary battery 1 and the capacitor 10.

In this second embodiment, it is possible to implement enhancement of the heat dissipation performance by apportioning the loss between the MOSFETs 31 and 32 that can handle high current and the internal resistance of the capacitor 10. Moreover, the magnitudes of the losses W(31), W(32), and W(10) in the MOSFETs 31 and 32 and the capacitor 10 when a large current flows during pre-charging are related to one another by W(32)≥W(31)>W(10), and it is a merit of this structure as well that the loss is dispersed to the MOSFET for discharging cutoff 32 and the MOSFET for charging cutoff 31 that are fundamentally designed for high current and that thus have excellent heat dispersion performance.

As described above, in this second embodiment, with this power supply device that includes the secondary battery 1 and the capacitor 10 that is connected in parallel therewith, the MOSFET for charging cutoff 31 and the MOSFET for discharging cutoff 32 constitute a switching circuit that is provided so as to be connected in series with the capacitor 10, so that it is arranged, when the voltage of the capacitor 10 is lower than the voltage of the secondary battery 1, to apportion the loss during current limitation between the MOSFET for charging cutoff 31 and the MOSFET for discharging cutoff 32.

Since it is possible to reduce the burden upon each of the MOSFETs in this manner, accordingly, along with enhancing the performance for heat dissipation, it also becomes possible to flow a high current continuously during pre-charging. As a result, it becomes possible to charge up the capacitor 10 to a state in which it can be used in a short time period, while maintaining suppression of temperature elevation of the secondary battery 1 and prevention of any deterioration thereof, due to the fact that the value of the pre-charge current is limited to a value that does not impose any serious burden upon the secondary battery 1. Furthermore since, as compared to the first embodiment, the MOSFET for pre-charging 33 is omitted, accordingly it is possible to anticipate reduction in cost and enhancement of compactness.

It should be understood that it would also be acceptable to connect a MOSFET for pre-charging 33 in parallel with the MOSFET for charging cutoff 31, so as to apportion the loss between the three MOSFETs. In this case, instead of simply performing ON control of the MOSFET for pre-charging 33, it would also be acceptable to perform control so as to adjust its gate voltage, and this may be done by performing PWM control. Moreover, as described in connection with the first embodiment, it would also be acceptable to build each or all of the MOSFETs 31 through 33 as a plurality of MOSFETs that are connected in parallel.

Embodiment 3

Figure 6:
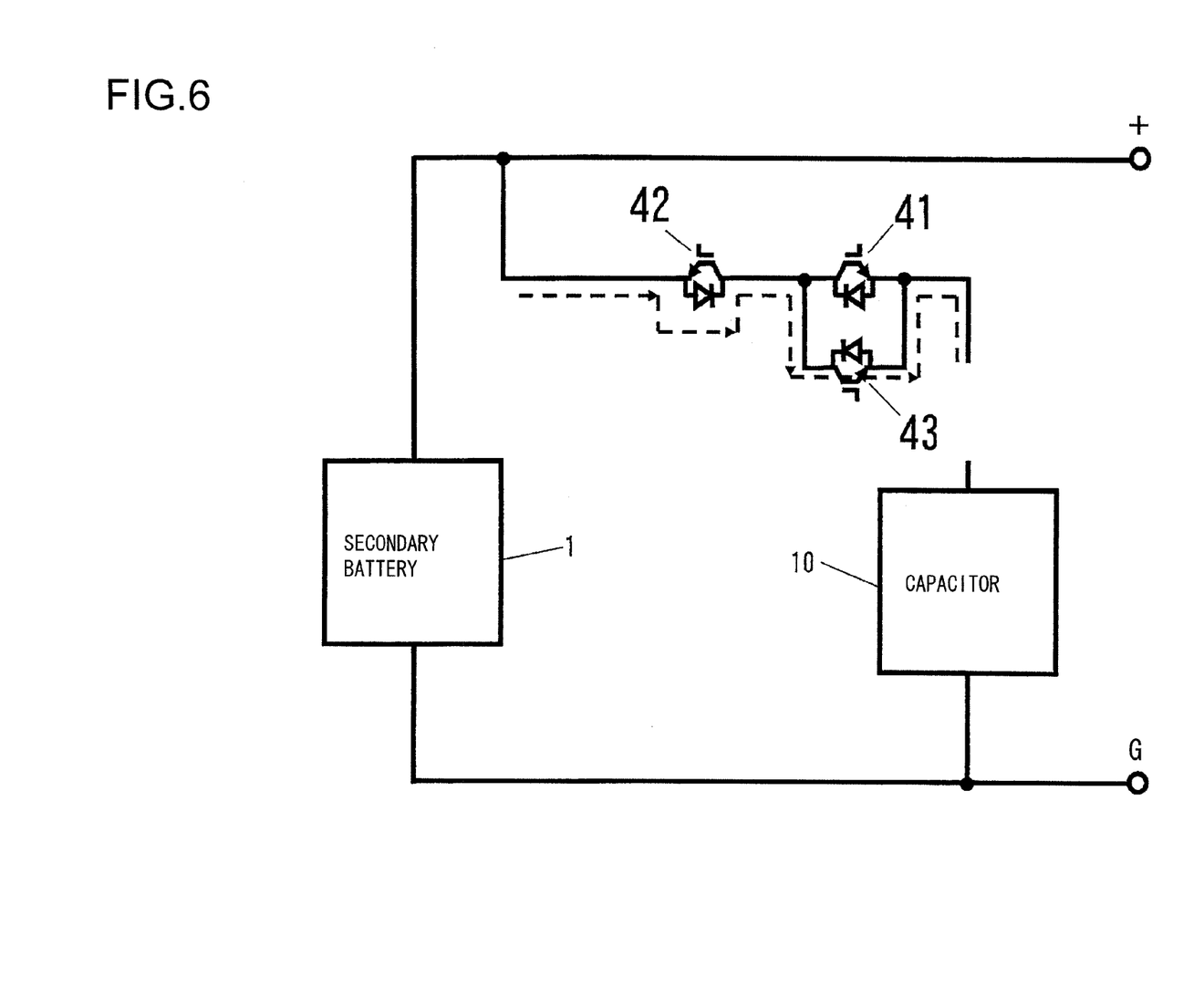
FIG. 6 is a figure for explanation of a power supply device according to a third embodiment of the present invention.

FIG. 6 is a figure for explanation of a power supply device according to a third embodiment of the present invention, and corresponds to FIG. 2 for the first embodiment. While MOSFETs were used as the semiconductor switching elements in the first embodiment described above, in this third embodiment a high voltage capacitor module is used as the capacitor 10, and it is arranged to use IGBT (Insulated Gate Bipolar Transistor) modules instead of MOSFETs.

As shown in FIG. 6, an IGBT for discharging cutoff 42 and an IGBT for charging cutoff 41 are provided in the positive side supply path from the capacitor 10 to the secondary battery 1, in series with the capacitor 10. And an IGBT for pre-charging 43 is connected in parallel with the IGBT for charging cutoff 41. In other words, in this circuit structure, the MOSFETs 31 through 33 shown in FIG. 2 are replaced by IGBTs 41 through 43.

It should be understood that, according to requirements, it would be acceptable to shift any of the IGBT for discharging cutoff 42, the IGBT for charging cutoff 41, and the IGBT for pre-charging 43 to the ground side, and it would also be acceptable further to add one or more IGBTs to the positive side or to the ground side. Moreover, a hybrid capacitor may be used for the high voltage capacitor 10. By applying a hybrid capacitor whose maximum cell voltage is higher than that of an electric double layer capacitor, it becomes possible to reduce the number of cells that are connected in series.

The IGBT for discharging cutoff 42 is set up so that its body diode is oriented oppositely to the discharge current direction of the capacitor 10. On the other hand, the IGBT for charging cutoff 41 and the IGBT for pre-charging 43 are set up so that their body diodes are oriented oppositely to the charging current direction of the capacitor 10. It should be understood that it would also be acceptable to employ a relay for pre-charging instead of the IGBT for pre-charging 43, since in this embodiment the voltage is high.

Next, the method of control in this third embodiment will be explained. During the normal usage state the IGBT for charging cutoff 41, the IGBT for discharging cutoff 42, and the IGBT for pre-charging 43 are all put into their ON states. When a start signal IGN is inputted from a higher level, the total voltage of the capacitor 10 and the voltage of the secondary battery 1 are compared together, and, if the voltage of the capacitor 10 is lower than the voltage of the secondary battery 1, then pre-charging is performed. While the threshold potential difference value that is the decision reference at this time is set to the forward voltage (for example 0.5 V) of the body diode of the IGBT for discharging cutoff 42 or greater, this may be varied according to requirements.

The current charging path to the capacitor 10 during pre-charging is as shown in FIG. 6 by the broken line, and, after the charging current has passed through the body diode of the IGBT for discharging cutoff 42, it passes through the IGBT for pre-charging 43 and flows into the capacitor 10. As previously described, with a hybrid capacitor, pseudo increase of the internal resistance can be caused by controlling the current stepwise. Accordingly, by driving the IGBT for pre-charging 43 stepwise, it is possible to increase its proportion of the loss imposed upon the capacitor 10 by pseudo increasing its internal resistance. As a result, even if the potential difference between the secondary battery 1 and the capacitor 10 is large, it is still possible to handle this situation appropriately.

While, in the example described above, the gate voltage that is normally required is applied to the IGBT for pre-charging 43 stepwise, it would also be acceptable to arrange to adjust the ON resistance of the IGBT for pre-charging 43 by adjusting its gate voltage, or to adjust the pre-charge current according to PWM control by supplying PWM pulses to the gate of the IGBT for pre-charging 43.

In the prior art, in order to perform current limitation during pre-charging, it was necessary for the burden of handling the loss to be handled only by a limiting resistor or by a semiconductor switching element for pre-charging (i.e. by a MOSFET). Moreover, since the permitted loss in a limiting resistor or a switching element is small, there was the shortcoming that it was difficult to flow a large current from several tens of amperes to several hundreds of amperes. However, in this embodiment, it is arranged to apportion the loss between the IGBT for discharging cutoff 42 that is adapted for high current discharge, the IGBT for pre-charging 43, and the internal resistance of the capacitor 10, and so it is possible to enhance the heat dissipation performance.

In this embodiment, the magnitudes of the losses W(10), W(42), and W(43) in the capacitor 10 (that is a hybrid capacitor) and the IGBTs 42 and 43 when a large current flows during pre-charging are related to one another by W(10)>W(42)>W(43), and it is a merit of this structure that the loss is dispersed to the IGBT for discharging cutoff 42 that is fundamentally designed for high current and that accordingly has excellent heat dispersion performance. Moreover, since it is possible to flow a high current during pre-charging, accordingly it is possible to reach a state in which the capacitor 10 can be used over a short time period. Moreover, since a semiconductor switching element is used instead of a relay or a limiting resistor as was used in the prior art, accordingly it is possible to anticipate that the system may be made more compact, and that its cost may be reduced.

It should be understood that, if a relay for pre-charging is used instead of the IGBT for pre-charging 43, then this relay should be closed during pre-charging. In this case, the losses are apportioned between the internal resistances of the IGBT for discharging cutoff 42 and of the capacitor 10.

While, in the embodiments described above, cases were described in which the present invention was applied to an idling stop system of a vehicle, the present invention is not limited to this application; it could be applied to any power supply device of a hybrid structure, the electrical power of which is supplied to various loads. Thus, it should be understood that the above explanation is only given by way of example, and that the present invention is not limited in any way by the embodiments described above, provided that the essential characteristics of the present invention are preserved. Moreover, it would also be possible to combine the embodiments and variant embodiments singly or in any plurality.

The contents of the disclosure of the following application, upon which priority is claimed, are hereby incorporated herein by reference:

Japanese Patent Application 2009-34019 (filed on 17 Feb. 2009).

The invention claimed is:

1. A power supply device, comprising:
   a capacitor connected in parallel with a battery;
   two switching circuits connected in series with the capacitor;
   a pre-charge switching circuit connected in parallel with one of the two switching circuits; and
   a control unit that, when a voltage of the capacitor is lower than a voltage of the battery, controls the pre-charge switching circuit and at least one of the two switching circuits and performs pre-charging current limitation for the capacitor,
   wherein each of the two switching circuits connected in series with the capacitor and the pre-charge switching circuit comprises a single semiconductor switching element, or a plurality of semiconductor switching elements that are connected in parallel;
   wherein the capacitor is a hybrid capacitor doped with lithium ions; and
   wherein, during pre-charging current limitation, the control unit controls the semiconductor switching element of the pre-charge switching circuit stepwise, so as to cause pseudo increase of internal resistance of the hybrid capacitor.

* * * * *